W. E. MOORE.
THRUST BEARING.
APPLICATION FILED APR. 25, 1913.

1,173,369.

Patented Feb. 29, 1916.
2 SHEETS—SHEET 1.

Witnesses
H. H. Murray
E. G. Marshall

Inventor
W. E. Moore,
By John H. Hoch
his Attorney

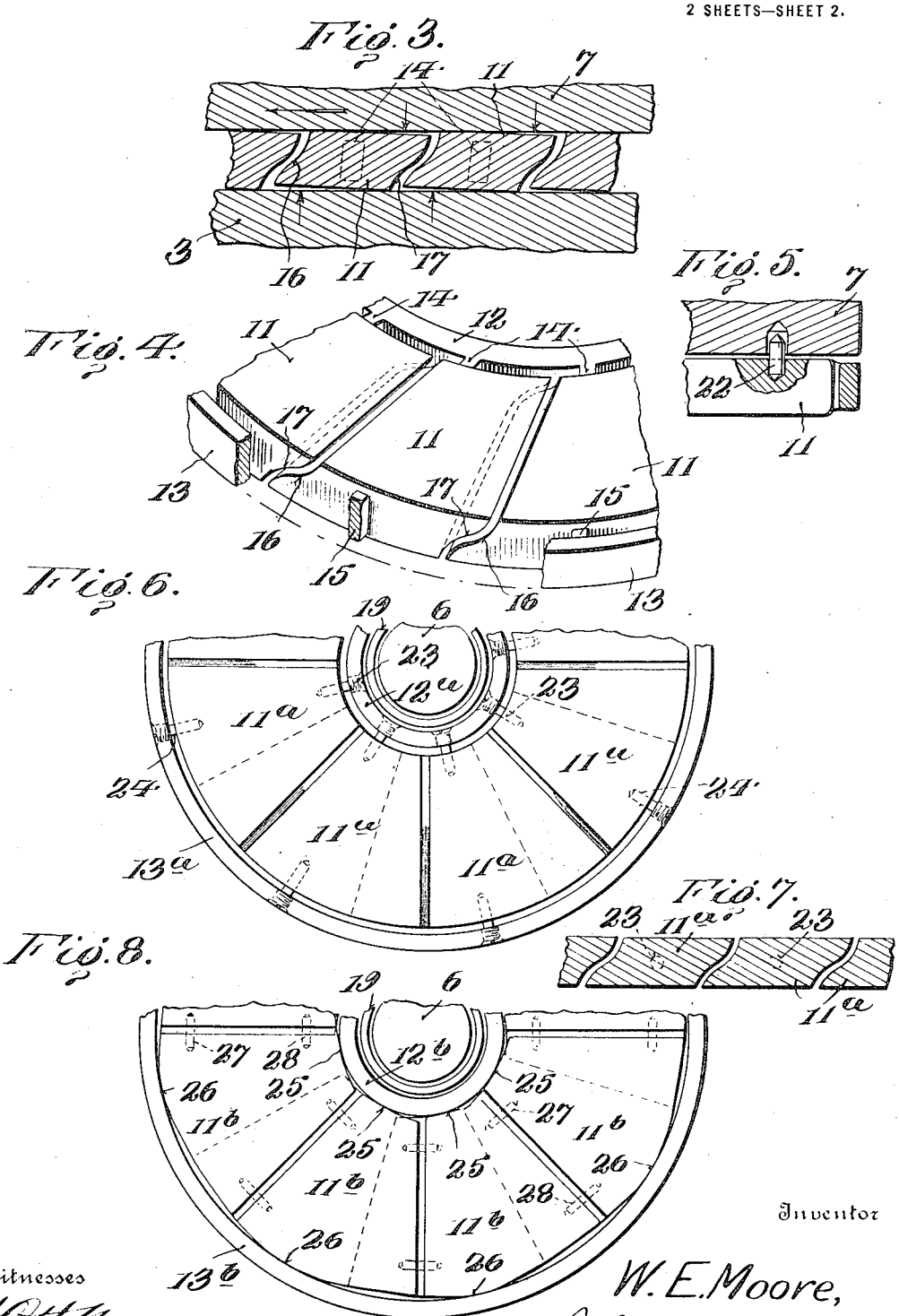

UNITED STATES PATENT OFFICE.

WILLIAM E. MOORE, OF PITTSBURGH, PENNSYLVANIA.

THRUST-BEARING.

1,173,369.  Specification of Letters Patent.  Patented Feb. 29, 1916.

Application filed April 25, 1913. Serial No. 763,624.

*To all whom it may concern:*

Be it known that I, WILLIAM E. MOORE, a citizen of the United States, residing at Pittsburgh, in the county of Allegheny and State of Pennsylvania, have invented certain new and useful Improvements in Thrust-Bearings, of which the following is a specification.

This invention relates more particularly to improved means for effecting lubrication of friction surfaces subject to great pressure such, for example, as thrust bearings, and the object of the said invention is to provide improved means for effecting this lubrication automatically.

Figure 1:
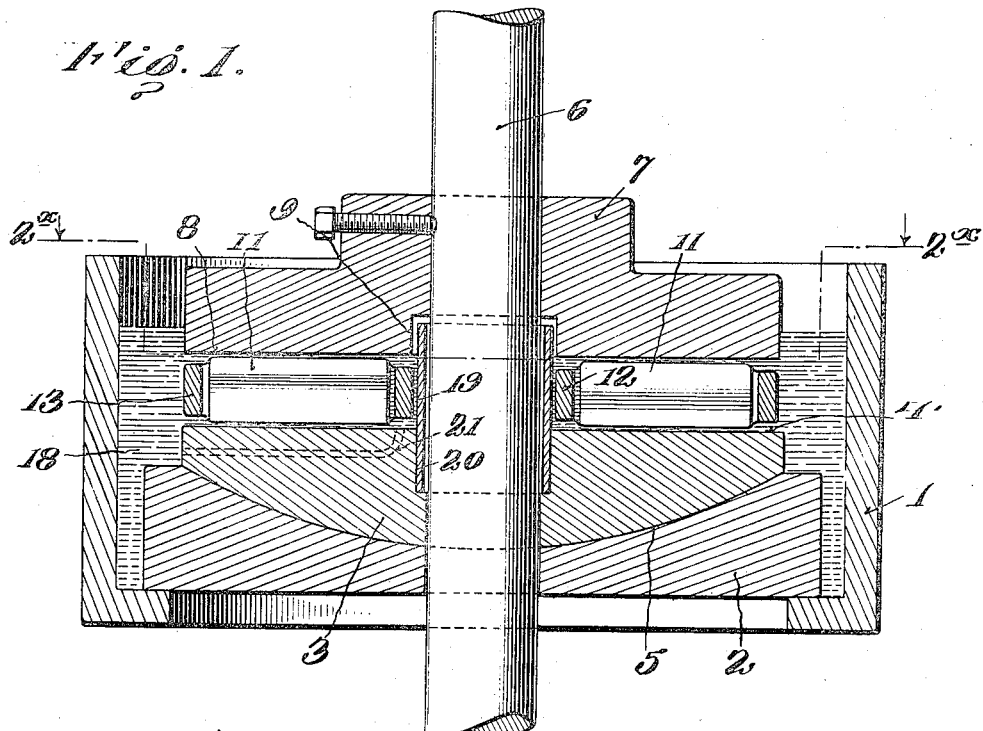
Figure 2:
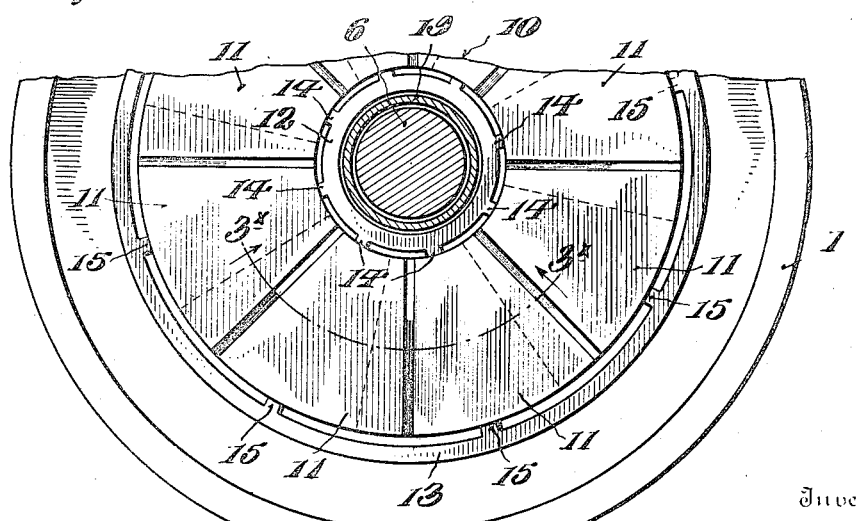

In order to more fully describe my said invention, reference will be had to the accompanying drawings wherein, Figure 1, is a central vertical section of a bearing embodying one form of my invention; Fig. 2, a fragmentary section on line $2^x$—$2^x$ Fig. 1, looking in the direction of the arrows, with the oil removed; Fig. 3, a fragmentary detail vertical section on line $3^x$—$3^x$ Fig. 2, looking in the direction of the arrows; Fig. 4, a detail fragmentary perspective view of a segmental washer; Fig. 5, a fragmentary detail section showing connection between washer and thrust collar; Fig. 6, a fragmentary top plan view, with portions removed, showing a modified form of said washer; Fig. 7, a fragmentary detail vertical cross section of the segments of the washer shown in Fig. 5, and Fig. 8, a fragmentary top plan view of still another modification of the washer.

Referring to the accompanying drawings, and first more particularly to Figs. 1 to 4 thereof, 1 represents a casing constituting the main oil reservoir, in which rests a cup seat 2, carrying a thrust block 3 having a flat or plane upper face 4, and a spherical lower face 5, the latter adapted to fit the cup 2. Extending through the center of cup seat 2 and block 3, and adapted to rotate therein, is a vertical shaft 6 which carries a thrust collar 7, fast thereon. This thrust collar has a flat or plane bearing face 8 on its lower side, and is cored out as at 9, for purposes which will hereinafter more fully appear. If the lower face of collar 7, and the upper face of block 3, constituted adjacent or engaging friction surfaces, it would be extremely difficult to maintain a film of lubricant between them, owing to the fact that such faces would maintain a uniform distance of separation, or contact equally, at all points. It is common practice in such cases to force a film of oil between such friction surfaces under great pressure supplied by external means. This practice, however, in addition to involving more or less expensive auxiliary mechanism, is open to the objection that if for any reason the pressure to force the lubricant between the friction surfaces should be even momentarily interrupted or diminished, such great friction is created between the engaging surfaces that they almost immediately run hot and often become destroyed before the trouble can be remedied. Efforts have been made to overcome this difficulty by providing means wherein the pressure of the bearing itself is designed to effect the automatic flow of a film of oil between the friction surfaces.

My invention is also designed to effect the automatic lubrication of the friction surfaces, and it employs the pressure of the bearing itself to effect the same, but in a different way from other devices which have been used for this purpose. I effect this automatic lubrication, in the form of my invention shown in Figs. 1 to 4, by inserting between the thrust collar 7 and block 3, a loose washer 10, comprising a plurality of facets or segments 11, held between two rings 12 and 13, each by two webs 14 and 15, at opposite ends of the segments. This washer is preferably made of some soft high lead bronze such, for example, as Ajax bronze and is cast in one integral piece, the mold for the casting being cored out to form the above parts. The edges of these segments, which radiate from the center of rotation of the system, slant in opposite directions as at 16 and 17, preferably on a reverse curve, and one such slanting edge of each segment over-laps a slanting edge of an adjacent segment.

The webs 14 and 15 of each segment lie in a line radiating from the center of rotation, and this line coincides with the central longitudinal axis of such segment, but owing to the slanting edges, each segment will have a greater area of contact with collar 7, or block 3, on one side of the line connecting its webs than on the other, and these distances are reversed on opposite sides of the segments. In other words, the bearing faces of the segments are off-set so that the centers of pressure are eccentric.

The segments are all of uniform thickness, but of greater thickness than the rings 12 and 13, so that the latter never contact with the bearing surfaces.

The casing 1 contains oil 18 maintained at or about the level indicated above the lower or bearing face of collar 7, said oil surrounding the segmented washer, as shown, surrounding shaft 6.

An oil retaining collar 19 is fitted tightly in a recess 20 in block 3, and extends above the oil level into recess 9, while an oil duct 21 extends from the outer surface of block 3, through the block to the space between the oil retaining collar and the inner ends of the washer segments.

Referring to Fig. 3, let it be assumed that the thrust collar 7 is rotating in the direction of the horizontal arrow, or clockwise. In such a case resultant pressures act on the individual segments in the directions of the vertical arrows, causing said segments to rotate to a limited extent about their radial axes or their web pivots, the webs yielding under the torsional strain to permit such movement of the segments. Such rotation inclines the upper and lower faces of the segments with respect to the faces of the thrust collar and block. This inclination permits the moving surface to drawn in oil globules which, rolling along the inclined surfaces, accumulate a pressure equal to the thrust. In this way a continuous film of oil is maintained between the bearing faces of the washer and the bearing faces of the thrust collar 7 and block 3. Of course this inclination of the segments is very slight as far as being visible to the naked eye is concerned, and for this reason is exaggerated in Fig. 3.

The segmental washer may rotate about shaft 6 with the upper bearing member 7, alone, or with the lower bearing member 3, alone, or it may be rotatable relative to both of these at the same time. Therefore, if the washer should stick to one of the bearing surfaces, it will still have another bearing surface to float on. If it is desired to actually provide means for causing the washer to rotate with one of these bearing members, this may be done by one or more dowel pins 22 connecting the parts as shown in Fig. 5.

The whole bearing may be adjusted by tilting the block 3 in its cup-shaped support.

In Fig. 6, I have shown a modification of the washer 11, of Figs. 1 to 4. In this modified construction the segments 11$^a$ are not cast integral with their supporting rings 12$^a$ and 13$^a$, but are pivoted therebetween by means of screws 23 and 24, which take the place of the webs of the first described construction. Otherwise the segments are the same in both cases.

In Fig. 8, I have shown still another modification of my improved washer, wherein the pivoting of the segments 11$^b$ between the rings is effected merely by swelling the ends of each segment out, as at 25 and 26, corresponding in position to the webs 14 and 15, or pivotal screws 23 and 24, the said segments engaging the rings 12$^b$ and 13$^b$ only at portions 25 and 26. The frictional engagement between these portions 25 and 26 and the rings 12$^b$ and 13$^b$ is sufficient to support the segments between the rings. These segments are held properly spaced one from the other by means of loosely fitting dowel pins 27 and 28. These segments are in other respects the same as segments 11.

Various other modifications of my present invention may be made without departing from the spirit thereof.

What I claim is:—

1. A thrust bearing, comprising two relatively rotatable members, and an integral washer inserted between said members and comprising a plurality of segments flexibly connected together to tilt between said members on radial axes.

2. A thrust bearing, comprising a rotatable bearing member, an adjustable stationary bearing member, and a washer inserted between said members and comprising a plurality of one piece segments located in a common horizontal plane and overlapping each other, and means flexibly connecting said segments together to tilt with respect to the bearing surface of each of said members.

3. A thrust bearing, comprising two relatively rotatable bearing members, and a washer inserted between said members and comprising a plurality of segments having overlapping edges separated by oil spaces, and means to flexibly connect said segments together to permit the same to rock on radial axes, to allow the oil from said spaces to enter between the bearing surface of said segments and the friction surface of its adjacent bearing member.

In testimony whereof I affix my signature in presence of two witnesses.

WILLIAM E. MOORE.

Witnesses:
G. E. BEAM,
L. C. LAMB.